US011205251B2

(12) United States Patent
Lai et al.

(10) Patent No.: US 11,205,251 B2
(45) Date of Patent: Dec. 21, 2021

(54) METHOD OF IMAGE COMPLETION

(71) Applicant: NATIONAL TSING HUA UNIVERSITY, Hsinchu (TW)

(72) Inventors: Shang-Hong Lai, Hsinchu (TW); Ching-Wei Tseng, Hsinchu (TW); Hung-Jin Lin, Taichung (TW)

(73) Assignee: NATIONAL TSING HUA UNIVERSITY, Hsinchu (TW)

(*) Notice: Subject to any disclaimer, the term of this patent is extended or adjusted under 35 U.S.C. 154(b) by 743 days.

(21) Appl. No.: 15/987,469

(22) Filed: May 23, 2018

(65) Prior Publication Data

US 2019/0236759 A1 Aug. 1, 2019

(30) Foreign Application Priority Data

Jan. 29, 2018 (TW) ................................ 107103068

(51) Int. Cl.
*G06T 5/00* (2006.01)
*G06K 9/62* (2006.01)
*G06T 3/60* (2006.01)
*G06N 3/04* (2006.01)
(Continued)

(52) U.S. Cl.
CPC ............ *G06T 5/005* (2013.01); *G06K 9/6257* (2013.01); *G06N 3/0454* (2013.01); *G06N 3/088* (2013.01);
(Continued)

(58) Field of Classification Search
CPC .. G06T 5/005; G06T 3/60; G06T 5/20; G06T 2207/20081; G06T 2207/20076;
(Continued)

(56) References Cited

U.S. PATENT DOCUMENTS 6,175,643 B1 * 1/2001 Lai .................. G06T 3/4046
382/131
10,157,332 B1 * 12/2018 Gray ................ G06K 9/00671
(Continued)

OTHER PUBLICATIONS

Denton, E., et al., "Semi-Supervised Learning with Context-Conditional Generative Adversarial Networks," ICLR 2017, Nov. 2016.*
(Continued)

*Primary Examiner* — Xuemei G Chen
(74) *Attorney, Agent, or Firm* — Muncy, Geissler, Olds & Lowe, P.C.

(57) ABSTRACT

A method of image completion comprises: constructing the image repair model and constructing a plurality of conditional generative adversarial networks according to a plurality of object types; inputting the training image corresponding to the plurality of objective types such that the plurality of conditional generative adversarial networks respectively conduct a corruption feature training; inputting the image in need of repair and respectively conducting an image repair through the plurality of conditional generative adversarial networks to generate a plurality of repaired images; and judging a reasonable probability of the plurality of repaired images through a probability analyzer, choosing an accomplished image and outputting the accomplished image through an output interface.

10 Claims, 8 Drawing Sheets
(2 of 8 Drawing Sheet(s) Filed in Color)

(51) Int. Cl.
*G06N 3/08* (2006.01)
*G06T 5/20* (2006.01)

(52) U.S. Cl.
CPC ............... *G06T 3/60* (2013.01); *G06T 5/20* (2013.01); *G06T 2207/20076* (2013.01); *G06T 2207/20081* (2013.01); *G06T 2207/20084* (2013.01)

(58) Field of Classification Search
CPC ........ G06T 2207/20084; G06K 9/6257; G06K 9/6271; G06N 3/0454; G06N 3/088; G06N 3/0472; G06N 7/005
See application file for complete search history.

(56) References Cited

U.S. PATENT DOCUMENTS

| | | | | |
|---|---|---|---|---|
| 10,210,631 | B1* | 2/2019 | Cinnamon | G06T 11/003 |
| 10,504,268 | B1* | 12/2019 | Huang | G06K 9/00302 |
| 2017/0365038 | A1* | 12/2017 | Denton | G06T 5/00 |
| 2018/0322366 | A1* | 11/2018 | Lim | G06K 9/6255 |
| 2019/0005358 | A1* | 1/2019 | Pisoni | G06N 3/08 |
| 2019/0012802 | A1* | 1/2019 | Liu | G06K 9/00664 |
| 2019/0057521 | A1* | 2/2019 | Teixeira | G06N 3/0445 |
| 2019/0114748 | A1* | 4/2019 | Lin | G06N 3/0454 |
| 2019/0130278 | A1* | 5/2019 | Karras | G06N 3/082 |
| 2019/0188534 | A1* | 6/2019 | Murrish | G06K 9/6262 |
| 2019/0196698 | A1* | 6/2019 | Cohen | G10L 15/22 |
| 2019/0198156 | A1* | 6/2019 | Madani | G16H 50/70 |
| 2019/0279345 | A1* | 9/2019 | Kim | G06K 9/6256 |
| 2020/0193661 | A1* | 6/2020 | Kaneko | G06T 11/40 |
| 2020/0294201 | A1* | 9/2020 | Planche | G06K 9/40 |
| 2020/0404190 | A1* | 12/2020 | Hutz | G06K 9/4628 |

OTHER PUBLICATIONS

Yeh, R. A., et al., "Semantic Image Inpainting with Deep Generative Models," CVPR 2017, Jul. 2017.*

* cited by examiner

METHOD OF IMAGE COMPLETION

CROSS-REFERENCE TO RELATED APPLICATION

This application claims priority from Taiwan Application No. 107103068, filed on Jan. 29, 2018, in the Taiwan Intellectual Property Office, the content of which is hereby incorporated by reference in their entirety for all purposes.

BACKGROUND OF THE INVENTION

Field of the Invention

The present invention relates to a method of image completion, especially relates to a method for repairing or editing images according to the lightweight conditional generative adversarial networks (cGAN) formed by different object types such that the repaired images may be clean images which are more natural and reasonable to conform to the needs of the users.

Description of the Related Art

In recent years, the method for repairing or editing images has been applied in the way of deep learning. However, the present method of image completion pays attention to the commonality and repairs the corrupted images through the model generated by training massive and non-classified data. Although the method has the commonality, the repaired object may still have defects or be unnatural. In addition, massive training data and massive operation of parameters are needed and the method is still defective in efficacy and practicability.

Accordingly, the goal that the companies related to image processing hope to achieve is to construct a conditional generative adversarial networks model based on the object type; after the conditional generative adversarial networks model is trained, proceed with the repair of the images through the lightweight deep belief networks; accomplish the users' need of repairing or editing images. Consequently, the inventors of the present invention think of and design a method of image completion for mending the defects of the prior art and improving the implementation in the industry.

SUMMARY OF THE INVENTION

In view of the aforementioned problems of the prior art, one objective of the present invention provides a method of image completion in order to solve the problems in which the repaired object may still have defects or be unnatural, and in which massive training data and massive operation of parameters are needed.

In accordance with one objective of the present invention, a method of image completion is provided. The method includes the following steps: configuring, in an image processor, an image repair model and constructing a plurality of conditional generative adversarial networks according to a plurality of object types; inputting respectively, by an input interface, a training image corresponding to the plurality of object types such that each of the plurality of conditional generative adversarial networks conducts a corruption feature training respectively; inputting, by the input interface, an image in need of repair and conducting an image repair through the plurality of conditional generative adversarial networks to generate a plurality of repaired images respectively; and judging, by a probability analyzer, a reasonable probability of the plurality of repaired images, choosing an accomplished image and outputting the accomplished image through an output interface.

Preferably, the image repair model may comprise an image transferring model and a judging model; the image transferring model transfers the image in need of repair to a sample image; and the judging model judges whether the sample image conforms to a real image or not.

Preferably, the corruption feature training may further comprise steps below: generating a plurality of corruption types through a mask processor; conducting destruction of the plurality of corruption types to the training image to form a plurality of corrupted images; and amending the image repair model through the plurality of corrupted images and the training image inputted in the beginning.

Preferably, the plurality of corruption types may comprise text corruption, line corruption, scribble corruption, random corruption or corruption of arbitrary polygons.

Preferably, the destruction to the training image may comprise rotating the plurality of corrupted images with a predetermined angle.

Preferably, the destruction to the training image may comprise rotating the plurality of corrupted images with a predetermined angle. The step of inputting the image in need of repair through the input interface further may comprise steps below: marking, by the input interface, a repair area on the image in need of repair; repairing the repair area of the image in need of repair through the plurality of conditional generative adversarial networks; and generating the plurality of repaired images.

Preferably, the step of inputting the image in need of repair through the input interface further may comprise steps below: marking, by the input interface, an erasure area on the image in need of repair; erasing an image of the erasure area and then conducting the image repair on the erasure area through the plurality of conditional generative adversarial networks; and generating the plurality of repaired images.

Preferably, the plurality of object types may comprise a car, a human being, a dog, a tree, a road or combination thereof.

Preferably, the plurality of object types may comprise facial features of human being, accessories or combination thereof.

Preferably, the plurality of conditional generative adversarial networks may be stored in a database respectively; the image processor connects to each of the databases and simultaneously accesses the plurality of conditional generative adversarial networks for conducting the image repair.

According to the above description, the method of image completion of the present invention may have one or more than one of the advantages described below:

(1) The present method of image completion can respectively construct conditional generative adversarial networks of various object types for image repair so as to form the lightweight deep belief networks configuration by reducing the number of the parameters in the model and hence reduce the quantity of operation to improve the entire operation efficiency.

(2) The present method of image completion can repair the images through various conditional generative adversarial networks and then choose the best result as an accomplished image for outputting such that the repaired image and the actual image can be more alike and the unnatural situations thereof may be diminished.

(3) The present method of image completion can be applied to general electronic devices and handheld devices.

There is not massive quantity of operation blocking the operation of the devices and thus the popularity of the application is increased.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

In order to provide understanding of the technical features, the content, the advantages and the achievable performance of the present invention, the present invention are presented through embodiments described below in detail in accordance with the accompanying drawings. The accompanying drawings are intended to illustrate and assist the specification and do not present the actual ratio and the precise configuration. Consequently, the ratio and the configuration relationship in the accompanying drawings should not be interpreted to limit the scope of claims of the present invention.

Figure 1:
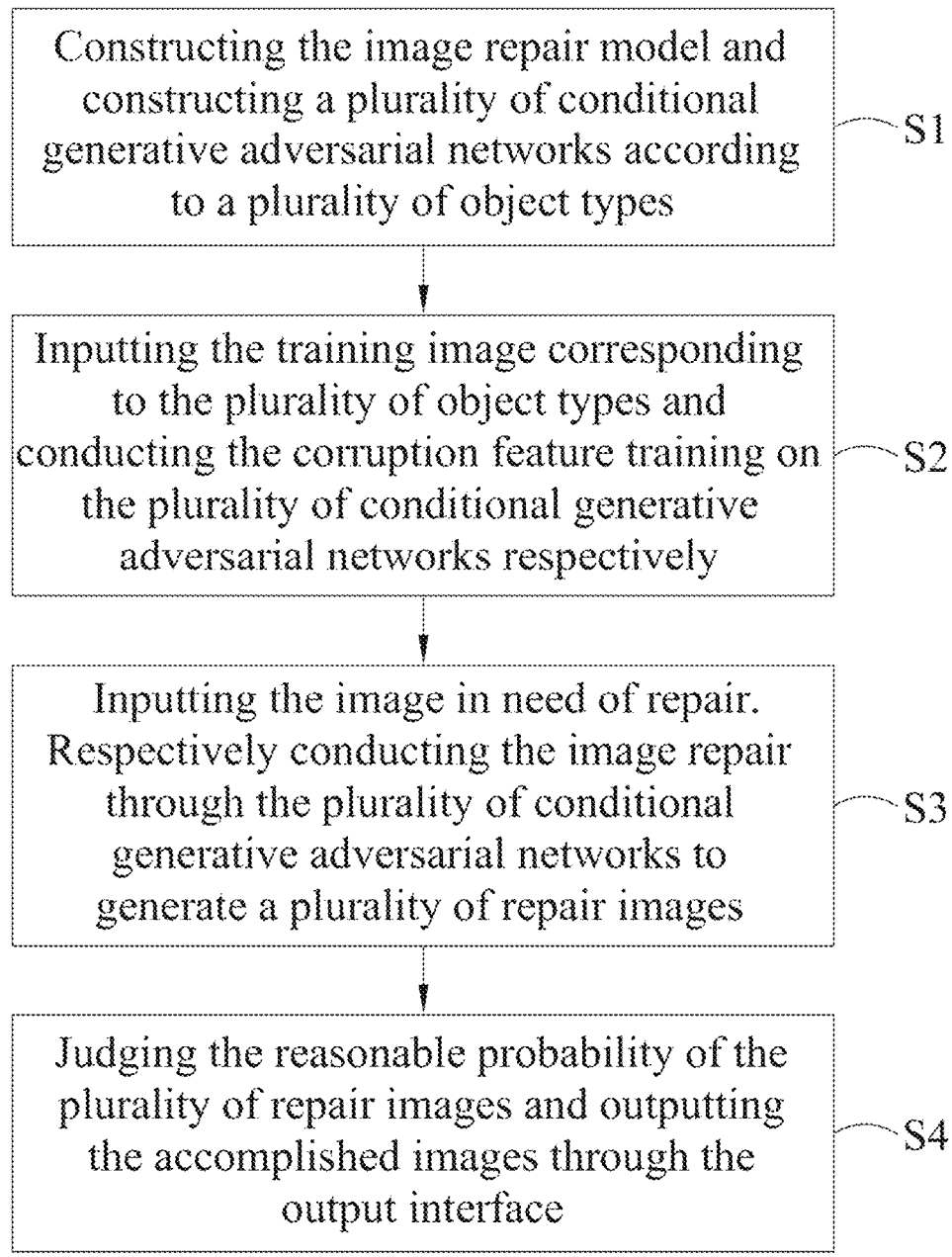
FIG. 1 illustrates the flow chart of the method of image completion according to an embodiment of the present invention.

Referring to FIG. 1, which illustrates the flow chart of the method of image completion of an embodiment of the present invention. As shown in FIG. 1, the method of image completion comprises the steps below (S1-S4):

Step 1: constructing the image repair model and constructing a plurality of conditional generative adversarial networks according to a plurality of object types. First, the generative adversarial network (GAN) may be applied for the deep learning method of image completion. The features of the generative adversarial network is the generative model $\mathcal{G}$ and the judging model $\mathcal{D}$. The generative model is used to transfer images and the judging model is used to judge the differences between the result of the transference and the actual image such that the result and the actual image are alike. The present embodiment constructs the model of image repair according to the base of the generative adversarial network. The model may be constructed according to the description below:

The corruption reconstruction (shown as $\mathcal{L}_{rec}$) between the image $\mathcal{G}(\mathcal{I})$ and the actual image $\mathcal{I}_g$ is calculated pixel-by-pixel according to the $l_1$-noun calculation rule, wherein the image $\mathcal{G}(\mathcal{I})$ is produced after the inputted corrupted image $\mathcal{I}$ is repaired. The term $\mathcal{L}_{rec}$ is shown in equation (1):

$$\mathcal{L}_{rec} = \frac{1}{H \times W} \sum_{x \in H} \sum_{y \in W} \|\mathcal{I}_g(x, y) - \mathcal{G}(\mathcal{I})(x, y)\|_1 \quad (1)$$

Wherein H and W are sizes of the image and x and y are coordinates of the image Next, in order to judge the differences between the produced image $\mathcal{G}(\mathcal{I})$ and the actual image $\mathcal{I}_g$ and further judge whether the degree of actuality and naturalness of the produced image is high enough to trick the judging model $\mathcal{D}$, equation (2) are shown as:

$$\mathcal{L}_{adv\_d} = \frac{1}{2} \times \|\mathcal{D}(\mathcal{I}_g) - 1\|_2 + \frac{1}{2} \times \|\mathcal{D}(\mathcal{G}(\mathcal{I})) - 0\|_2 \quad (2)$$

Meanwhile, in order to induce the generative model $\mathcal{G}$ to generate the actual image, the error between $\mathcal{D}(\mathcal{G}(\mathcal{I}))$ and the actual label is minimized in the present embodiment, as shown in equation (3):

$$\mathcal{L}_{adv\_g} = \frac{1}{2} \times \|\mathcal{D}(\mathcal{G}(\mathcal{I})) - 1\|_2 \quad (3)$$

In summary, the image repair model constructed in the present embodiment is shown in equation (4);

$$\mathcal{G}*_{=\arg\min} n_{\mathcal{G}, \mathcal{D}} \lambda_{\mathcal{G}} \mathcal{L}_{rec} + \lambda_{\mathcal{D}} \mathcal{L}_{adv\_g} + \lambda_{\mathcal{D}} \mathcal{L}_{adv\_d} \quad (4)$$

Wherein $\lambda_{\mathcal{G}} \mathcal{L}_{rec} + \lambda_{\mathcal{D}} \mathcal{L}_{adv\_g}$ is the generative model $\mathcal{G}$, $\lambda_{\mathcal{D}} \mathcal{L}_{adv\_d}$ is the judging model $\mathcal{D}$ and the parameters $\lambda_{\mathcal{G}}$ and $\lambda_{\mathcal{D}}$ are used to balance the loss effect.

Figure 2:
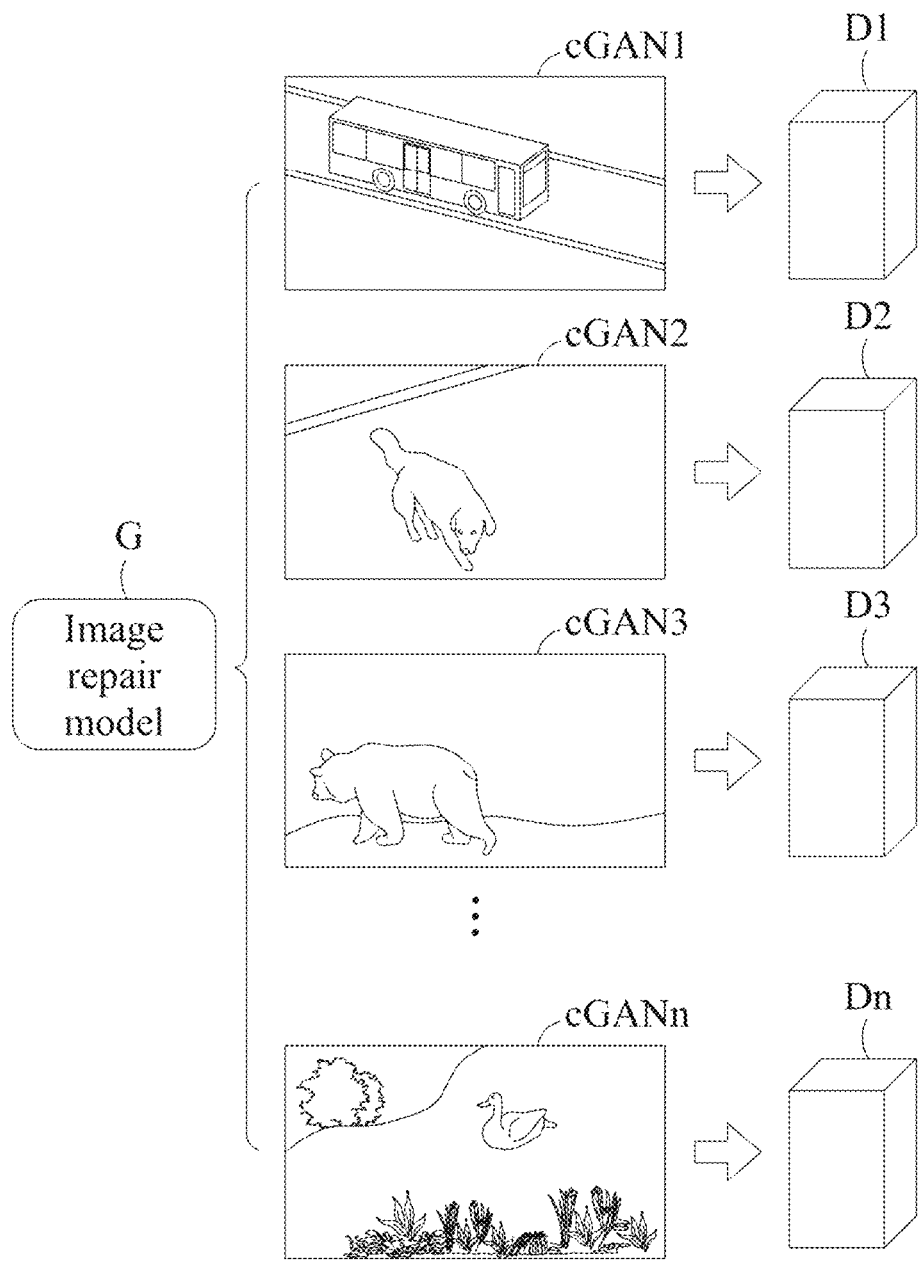
FIG. 2 illustrates the conditional generative adversarial networks according to an embodiment of the present invention.

After constructing the deep-learning image repair model described above, the conditional generative adversarial networks corresponding to different object types are constructed. The different object types described here may comprise a car, a human being, a dog, a tree, a road or the combinations thereof. However, the present invention is not limited to this. Users may construct the conditional generative adversarial networks of different object types according to the image type and the repair requirements. Referring to FIG. 2, which illustrates the conditional generative adversarial networks of an embodiment of the present invention. As shown in FIG. 2, the image repair model G may comprise the conditional generative adversarial networks cGAN1 of a car, the conditional generative adversarial networks cGAN2 of a dog, the conditional generative adversarial networks cGAN3 of a bear, etc., and the conditional generative adversarial networks cGANn of the combinations thereof. The combinations described here may comprise various object types and have a higher degree of synthesis. As the deep learning networks are classified according to types of the corresponding training images when trained in the sequential training phase, the results of image repair may be better for the same type or the similar type of images.

In addition, the conditional generative adversarial networks of different object types may be stored in different databases D1-Dn. The image processor may connect to each database D1-Dn through networks to proceed with the sequential feature training and corruption repairs and improve the operation efficiency by simultaneously accessing each of the conditional generative adversarial networks. The databases described here may comprise computer and memory of server, and the image processors may be one or more processors or multi-core processors of a computer or a server.

Step S2: Inputting the training image corresponding to the plurality of object types and conducting the corruption feature training on the plurality of conditional generative adversarial networks respectively. As the image repair models have been classified according to the object types in the previous step, the images for input are selected according to the object types when each of the deep learning networks is trained. For example, the conditional generative adversarial networks cGAN1 of a car are trained, images of other cars, such as a minibus, may also be used besides the bus image shown in FIG. 2 such that the corrupted images are trained through images related to cars in the training process. When images of human beings are in need of repair, the training images for input may be facial features of human beings for respectively constructing the corresponding conditional generative adversarial networks. Facial accessories such as glasses, masks, earrings and hair ornaments may also be applied additionally to construct the repair model basing on the corresponding object.

Figure 3:
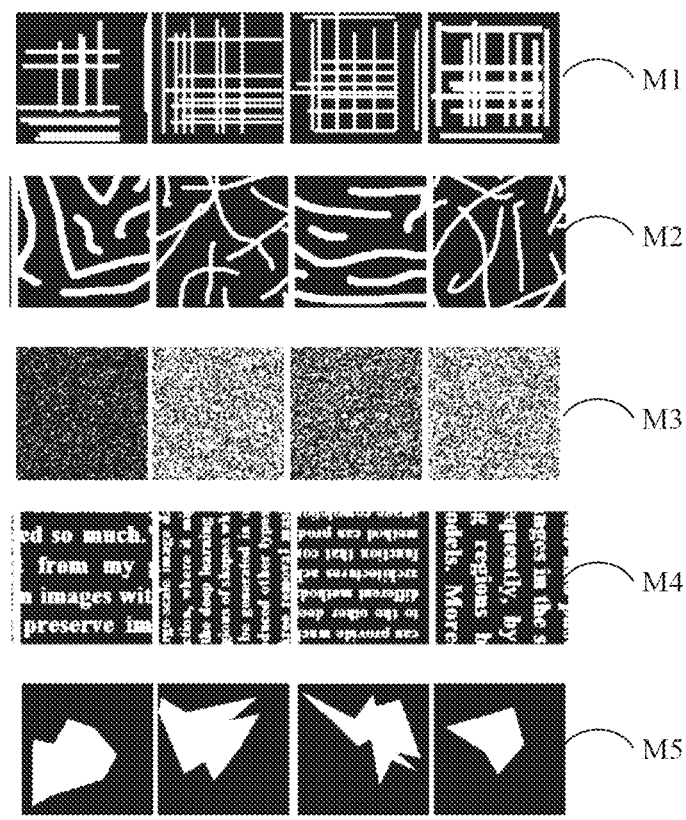
FIG. 3 illustrates corruption types according to an embodiment of the present invention.

In addition, a mask processor may be applied to generate different corruption types for the differences of the corruption types in the training process. Through different types of defect mask models, the conditional generative adversarial networks may effectively repair different types of defects. Referring to FIG. 3, which illustrates the corruption types of an embodiment of the present invention. The corruption types may mainly be classified as line corruption M1, scribble corruption M2, random corruption M3, text corruption M4 or corruption of arbitrary polygons M5 etc. however, the present invention is not limited thereto. Further, line corruption M1 may be lines having a width of 2-4 pixels and may be a certain number of cross patterns in horizontal and vertical directions. Scribble corruption M2 similar to line corruption M1 may have a width of 2-4 pixels. However, patterns of M2 are random lines rather than lines in horizontal or vertical directions. Random corruption M3 refers to removing pixels of patterns according to a certain ratio. For example, choosing patterns of pixels of a certain ratio in the predetermined area to be removed. Text corruption M4 refers to designs of patterns having texts of different sizes and fonts which may be distinguished into the vertical term and the horizontal term as well. In the above description, patterns of defect masks are mainly formed according to the corruption types of partial regions. In addition, corruption of arbitrary polygons M5 take polygons of larger entire area as the defect mask. All of the foregoing patterns may be rotated 90 degrees, 180 degrees or 270 degrees to generate new patterns. After the mask processor generates different corruption types, one may conduct destruction of different corruption types to the training image to forth different corrupted images, repair the corrupted images through the conditional generative adversarial networks and compare the corrupted images with the originally inputted images to amend the parameters of the image repair model.

Step S3: inputting the image in need of repair. Respectively conducting the image repair through the plurality of conditional generative adversarial networks to generate a plurality of repaired images. After accomplishing the training of the image repair model, a plurality of conditional generative adversarial networks may be stored in the same or different computers or servers. In addition, the repair model may be installed as software in various types of electronic devices such as handheld cell phones, tablet computers, desktop computers or servers. In the test phase or the actual operating phase, users may input the image in need of repair through the foregoing devices and access the repair model of each conditional generative adversarial network through the image repair program in order to respectively repair the images in need of repair. Since the repair model of each conditional generative adversarial network conducts the training according to the object type, there are differences between the accomplished models. Consequently, the images in need of repair generate different repaired images corresponding to each conditional generative adversarial network.

Step S4: judging the reasonable probability of the plurality of repaired images and outputting the accomplished images through the output interface. Since the plurality of repaired images generated in the foregoing steps are different from each other, the image repair program is further applied to judge the reasonable probability of each repaired image through the probability analyzer. Here, the judging method comprises configuring another judging model to compute the probability value corresponding to each result, choosing the best repaired image as the accomplished image by comparing the reasonable probability value of each conditional generative adversarial network and outputting the accomplished image through the foregoing handheld devices or computers.

Figure 4:
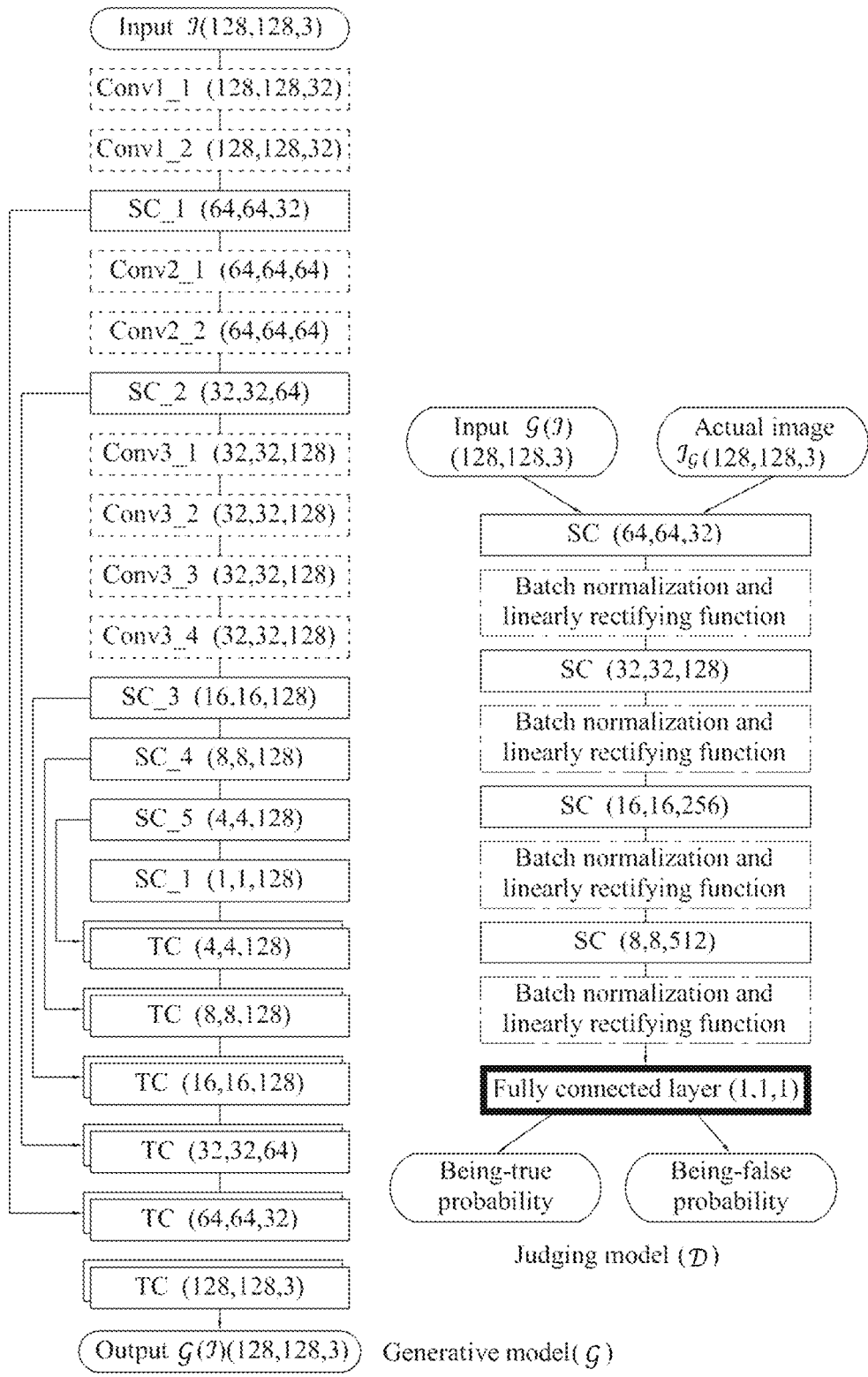
FIG. 4 illustrates the generative model and the judging model of an embodiment of the present invention.

Please refer to FIG. 4, which illustrates the generative model and the judging model of an embodiment of the present invention. As shown in FIG. 4, the generative model $\mathcal{G}$ of the present embodiment comprises multiple layers of convolution and transformation which extract features of the inputted corrupted image $\mathcal{I}$ ranked from high resolution to low resolution through the first half coding layers of the generative model $\mathcal{G}$, gradually generate results ranked from low resolution to high resolution in the second half coding layers and attach features corresponding to the resolution in the coding layers in order to enhance the pattern structure of the outputted result. The judging model $\mathcal{D}$ judges the quality of the generative result $\mathcal{G}(\mathcal{I})$ and provides the amending direction corresponding to the generative model $\mathcal{G}$ to achieve better performance of the entire model. Next, the processing configuration of the generative model $\mathcal{G}$ and the judging model $\mathcal{D}$ of the present embodiment will be further explained.

The generative model $\mathcal{G}$ is mainly constructed of three kinds of convolution operation including the normal convolution layer of the dotted-line block, the strided convolution layer of the solid-line block and the transposed convolution layer of the shaded block. 3×3 convolution kernels are used in all of the convolution operation layers. English abbreviations and numbers are used to name and group each of the convolution layers. For example, the first group comprises the first convolution layer Conv1_1, the second convolution layer Conv1_2 and the first strided convolution layer SC_1; the second group comprises the first convolution layer Conv2_1, the second convolution layer Conv2_2 and the second strided convolution layer SC_2; the third group comprises the first convolution layer Conv3_1, the second convolution layer Conv3_2, the third convolution layer Conv3_3, the fourth convolution layer Conv3_4 and the third strided convolution layer SC_3; each of the fourth group to the sixth group comprises a strided convolution layer SC_4, SC_5 and SC_6. In this way, the feature maps produced from the same group have the same dimensions. As the number shown in the bracket of each layer, the first two digits represent the resolution and the last digit represents the feature dimension. Here, the objects of the normal convolution layer and the strided convolution layer are both to further mix and expand the information generated by the previous layer. It is desired to capture features of patterns in different layers by gradually expanding the receptive field of the posterior layers. The stride convolution layer differs from the normal convolution layer by setting the stride as 2. The resolution of the feature map generated by the strided convolution layer is spontaneously halved in order to exchange information more efficiently and reduce the degree of complexity of the operation.

The transposed convolution layer TC is used to integrate the previous information layer by layer so as to increase the diminishing resolution of the feature map back to the originally inputted resolution. Thus, the magnification is set to be 2. In addition, the skip connection is simultaneously applied in this design in order to combine the foregoing feature map corresponding to the resolution with the present result of the transposed convolution and then pass it. The goal is to prompt and assist the generative result of the transposed convolution through the first few layers having a lot of information of the object structure such that the generative result may be as consistent with the structure of the original pattern as possible. The generative model $\mathcal{G}$ of the present embodiment may output the generative image $\mathcal{G}$ ($\mathcal{I}$) through the foregoing convolution and transformation after the corrupted image $\mathcal{I}$ is inputted. However, the forms and the numbers of the convolution layers of the present invention are not limited to the structure described in FIG. 4. The adjustment of the forms and the numbers of the convolution layers of the generative model for patterns having different resolution should also be included in the scope of claims of the present application.

The judging model $\mathcal{D}$ is constructed of the strided convolution layer of the solid-line block, the batch normalization layer of the dot-chain block and the fully connected layer of the bold-line block. The stride of the strided convolution layer SC is also set as 2. The strided convolution layer SC rapidly reduces the resolution of the generative image $\mathcal{G}(\mathcal{I})$ and the actual image $\mathcal{I}_g$ to extract features of different layers. The batch normalization layer comprises the combination of the batch normalization and the linearly rectifying function. There are different distributions between information of each image and the normalization of the feature maps of each layer is needed to achieve effective and stable training because of the batch of information in the training phase. Finally, the fully connected layer is used to connect the feature map to the true-or-false probability analyzer, showing whether or not the generative image is reasonable by judging the being-true probability and the being-false probability.

Figure 5A:
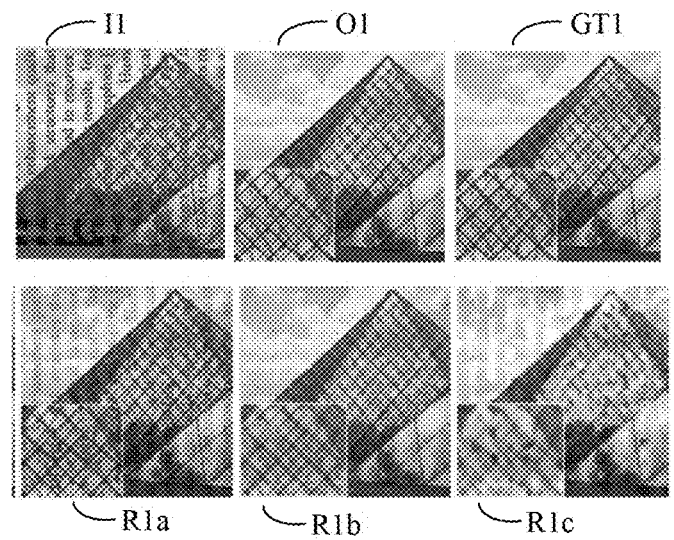
FIGS. 5A-5D illustrate the results of image repair of an embodiment of the present invention.

Referring to FIG. 5A to FIG. 5D, which illustrate the results of image repair of an embodiment of the present invention. As shown in FIG. 5A, the inputted image in need of repair I1 is an image having text corruption. The accomplished image O1 is outputted and the texts have been removed by conducting the method of image completion of an embodiment of the present invention. The accomplished image O1 and the original image GT1 are alike in comparison with the images R1a, R1b and R1c respectively repaired through the methods of the prior art RED-Net, Context Encoder and pix2pix even though the comparison is proceeded in those partially enlarged images which are shown in the lower left corner of each images. That is, the method of image completion of the present embodiment makes the performance of image repair more natural for both of the entire effect and the partial and detail features.

For the foregoing methods of the techniques, one may refer to "Xiao-Jiao Mao, Chunhua Shen, and Yu-Bin Yang. "Image restoration using convolutional auto-encoders with symmetric skip connections" arXiv preprint arXiv: 1606.08921, 2016" for the method RED-Net, refer to "Deepak Pathak, Philipp Krahenbuhl, Jeff Donahue, Trevor Darrell, and *Alexei* A Efros. Context encoders: Feature learning by inpainting. arXiv preprint arXiv:1604.07379, 2016" for the method Context Encoder and refer to "Phillip Isola, Jun-Yan Zhu, Tinghui Zhou, and *Alexei* A Efros. Image-to-image translation with conditional adversarial networks. arXiv preprint arXiv:1611.07004, 2016" for the method pix2pix.

Figure 5B:
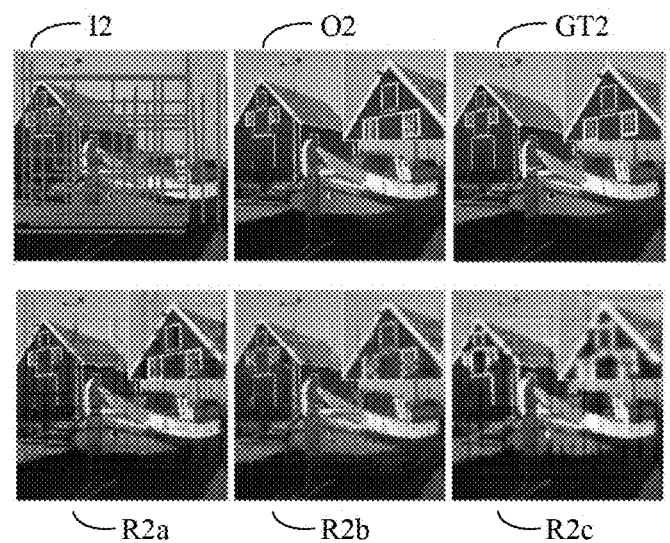
Figure 5C:
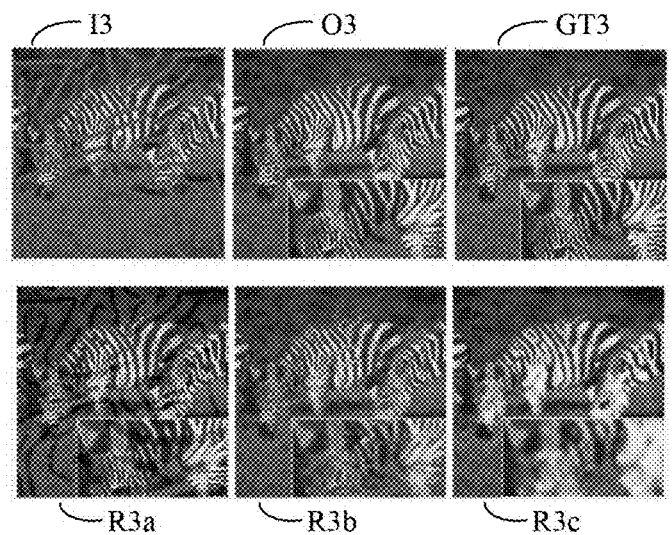
Figure 5D:
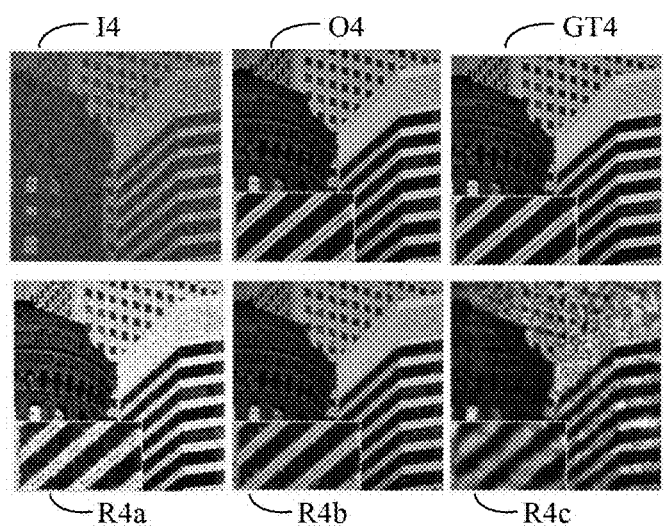

Referring to FIG. 5B, in which the inputted image in need of repair I2 is an image having line corruption. The accomplished image O2 is outputted and the lines have been removed by conducting the method of image completion of an embodiment of the present invention. The accomplished image O2 and the original image GT2 are much alike. By comparison, each of the images R2a, R2b and R2c respectively repaired through the methods of the prior art RED-Net, Context Encoder and pix2pix still has marks of the lines. That is, the foregoing methods of the prior art cannot achieve the repair effect of the embodiment of the present invention. Similarly, referring to FIG. 5C, the inputted image in need of repair I3 is an image having scribble corruption. The accomplished image O3 is outputted and the scrawl has been removed by conducting the method of image completion of an embodiment of the present invention. The accomplished image O3 and the original image GT3 are much alike. By comparison, each of the images R3a, R3b and R3c respectively repaired through the methods of the prior art RED-Net, Context Encoder and pix2pix still has lacks of the repair effect of the embodiment of the present invention. Finally, referring to FIG. 5D. The inputted image in need of repair I4 is an image having random corruption. The accomplished image O4 is outputted and the scrawl has been removed by conducting the method of image completion of an embodiment of the present invention. The accomplished image O4 and the original image GT4 are much alike. By comparison, each of the images R4a, R4b and R4c respectively repaired through the methods of the prior art RED-Net, Context Encoder and pix2pix still has lacks of the repair effect of the embodiment of the present invention.

Figure 6:
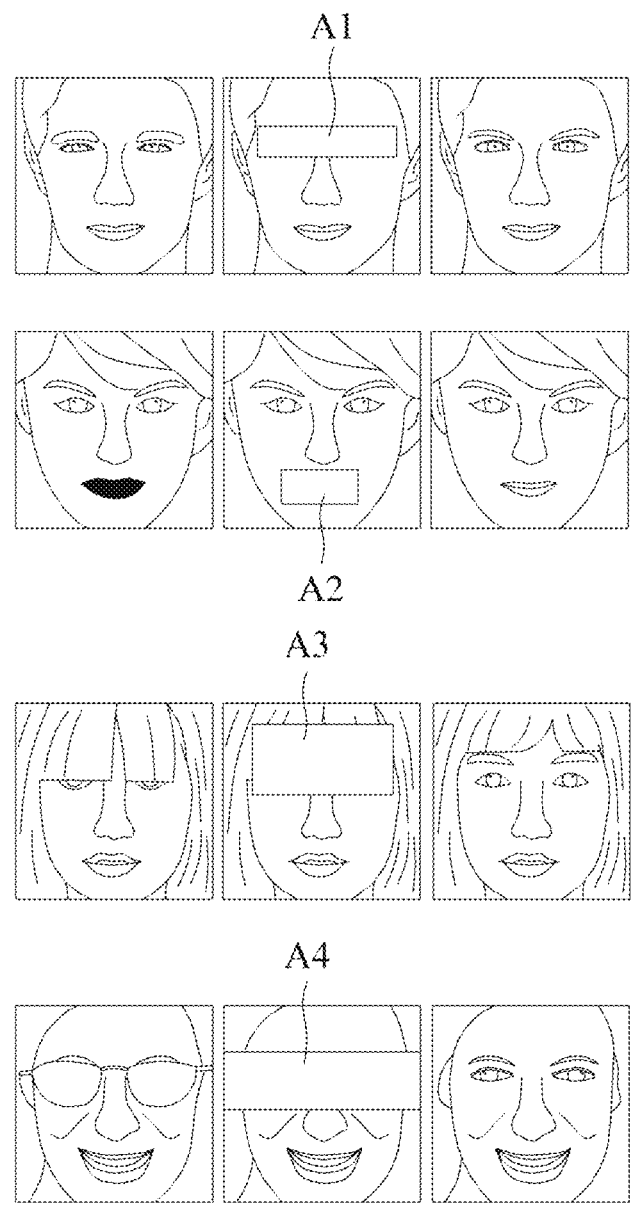
FIG. 6 illustrates the repair area and the erasure area of an embodiment of the present invention.

FIG. 6 illustrates the repair area and the erasure area of an embodiment of the present invention. As shown in FIG. 6, the method of image completion of an embodiment of the present invention applied in a specific repair area may take the image repair of human face as an example. The images on the left side of FIG. 6 are the originally inputted images. After the image in need of repair is inputted, users may choose a specific repair area on the image in need of repair through the input interface such as touch screen or mouse, as shown in the middle portion of FIG. 6. The plurality of conditional generative adversarial networks in the method of image completion of the present invention conduct the image repair process in the repair area and generate a plurality of repaired images. Similarly, the probability analyzer judges which one is the best image and chooses the accomplished image, as shown on the right side of FIG. 6, as the repair result.

In detail, taking the first row of FIG. 6 for example, when users choose the eyes of the face as the repair area A1, the image repair model may conduct the image repair process in the repair area A1 according to each of the deep learning networks of the object types, judge the best repaired image and then output the accomplished image. As shown in FIG. 6, the image which has narrow eyes is transferred to the image which has focused eyes. Similarly, when users choose the lips of the face as the repair area A2, the image repair model may modify the lip portion according to the image repair model of the present invention such that the lip portion may be more natural.

Take the third row and the fourth row of FIG. 6 for example. Another embodiment of the present invention may replace the repair area with the erasure area, besides the image repair process in the repair area. In this case, the image in the erasure area is erased. In detail, when users want to delete the bangs of the face in the inputted image, as shown in FIG. 6, they may choose the erasure area A3. However, after the image of the erasure area A3 is erased, the image repair process is still needed in the erasure area A3 such that the erased image is not blank or unnatural. Similarly, users may choose the accessories, such as glasses, on the face as the erasure area A4. After the image of glasses is erased, the image repair process is applied in the erasure area A4 and the accomplished image, as shown on the right side of FIG. 6, is outputted. No matter which type the image is, such as scenery, human being or face having fine portions, the method of image completion disclosed in the present application may be applied for the image repair or the image editing such that the accomplished image is natural and meets the user's needs. Because the plurality of conditional generative adversarial networks are constructed according to the object types, the number of parameters used in the image repair model may be reduced such that the image repair model is a lightweight model and has an better performance of processing quantity and operation quantity in the training and operation of the deep learning networks. The entirely improved operation efficiency may also benefit the application of the image repair method to general electronic devices and handheld devices and increase the popularity.

Figure 7:
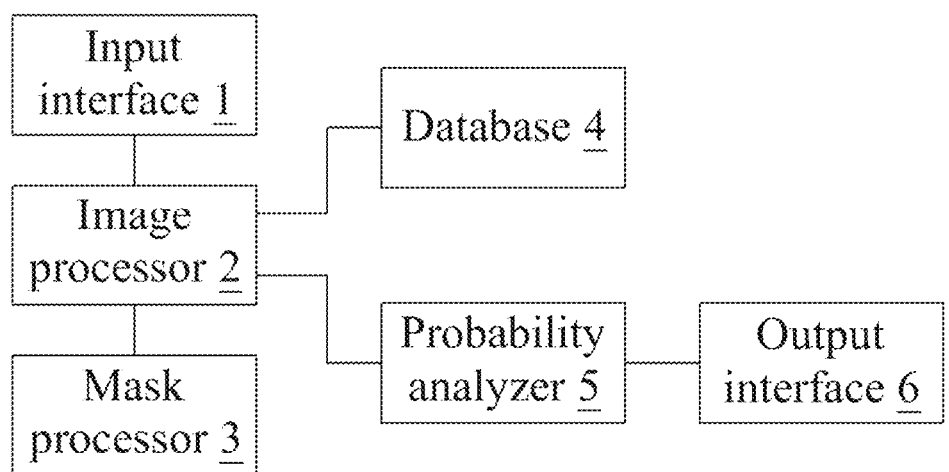
FIG. 7 illustrates a system of image completion according to an embodiment of the present invention.

According to an embodiment of the present invention, FIG. 7 illustrates a system of image completion comprising an input interface 1, an image processor 2, a mask processor 3, one or more database 4, a probability analyzer 5 and an output interface 6. The input interface 1 may input the training image and the image in need of repair and mark the repair area and/or the erasure area on the image in need of repair. The image repair model may be configured in the image processor 2. The mask processor 3 may generate the plurality of corruption types. The databases 4 store the plurality of conditional generative adversarial networks. The probability analyzer 5 may judge a reasonable probability of the plurality of repaired images. The output interface 6 outputs the accomplished image.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the teams first, second, third, etc. may be used herein to describe various elements, components, loops, circuits, and/or modules, these elements, components, loops, circuits, and/or modules should not be limited by these terms. These terms may be only used to distinguish one element, component, loop, circuit or module from another element, component, loop, circuit or module. Tel ns such as "first," "second," and other numerical terms when used herein do not imply a sequence or order unless clearly indicated by the context. Thus, a first element, component, loop, circuit or module discussed below could be termed a second element, component, loop, circuit or module without departing from the teachings of the example implementations disclosed herein.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The above description is merely illustrative and not restrictive. Any equivalent modification or change without departing from the spirit and scope of the present disclosure should be included in the appended claims.

What is claimed is:

1. A method of image completion, comprising:
    configuring, in an image processor, an image repair model and constructing a plurality of conditional generative adversarial networks corresponding to a plurality of object types;
    inputting respectively, by an input interface, training images corresponding to the plurality of object types such that each of the plurality of conditional generative adversarial networks conducts corruption feature training respectively;
    inputting, by the input interface, an image in need of repair and conducting image repair through the plurality of conditional generative adversarial networks to generate a plurality of repaired images respectively; and
    computing, by a first judging model, a reasonable probability of each of the plurality of repaired images, choosing an accomplished image and outputting the accomplished image through an output interface.

2. The method of image completion of claim 1, wherein the image repair model comprises an image transferring model and a second judging model; the image transferring model transfers the image in need of repair to a sample image; and the second judging model judges whether or not the sample image conforms to a real image.

3. The method of image completion of claim 1, wherein the corruption feature training further comprises steps below:
    generating a plurality of corruption types by a mask processor;
    conducting destruction of the plurality of corruption types to the training image to form a plurality of corrupted images; and
    amending the image repair model through the plurality of corrupted images and the originally inputted training image.

4. The method of image completion of claim 3, wherein the plurality of corruption types comprise text corruption, line corruption, scribble corruption, random corruption or corruption of arbitrary polygons.

5. The method of image completion of claim 3, wherein the destruction to the training image comprises rotating the plurality of corrupted images with a predetermined angle.

6. The method of image completion of claim 1, wherein the step of inputting the image in need of repair through the input interface further comprises steps below:
    marking, by the input interface, a repair area on the image in need of repair; repairing the repair area of the image in need of repair through the plurality of conditional generative adversarial networks; and generating the plurality of repaired images.

7. The method of image completion of claim 1, wherein the step of inputting the image in need of repair through the input interface further comprises steps below:
    marking, by the input interface, an erasure area on the image in need of repair; erasing an image of the erasure area and then conducting the image repair to the erasure area through the plurality of conditional generative adversarial networks; and generating the plurality of repaired images.

8. The method of image completion of claim 1, wherein the plurality of object types comprise a car, a human being, a dog, a tree, a road or combination thereof.

9. The method of image completion of claim 1, wherein the plurality of object types comprise facial features of human being, accessories or combination thereof.

10. The method of image completion of claim 1, wherein the plurality of conditional generative adversarial networks are stored in a database respectively; the image processor connects to each of the databases and simultaneously accesses the plurality of conditional generative adversarial networks for conducting the image repair.

\* \* \* \* \*